United States Patent [19]

Johnson et al.

[11] 4,290,847
[45] Sep. 22, 1981

[54] MULTISHELL MICROCAPSULES

[75] Inventors: James R. Johnson, White Bear Lake; William C. Flanagan, Jr., Roseville, both of Minn.

[73] Assignee: Minnesota Mining and Manufacturing Company, St. Paul, Minn.

[21] Appl. No.: 630,311

[22] Filed: Nov. 10, 1975

[51] Int. Cl.² .................................................. G21B 1/00
[52] U.S. Cl. ................................. 176/1; 176/91 SP; 427/6; 427/212; 428/403; 252/317
[58] Field of Search ................... 176/1, 91 SP; 427/5, 427/6, 212, 214, 215, 213; 428/403–406

[56] References Cited

U.S. PATENT DOCUMENTS

| | | | |
|---|---|---|---|
| 3,122,595 | 2/1964 | Oxley | 428/403 |
| 3,129,188 | 4/1964 | Sowman et al. | 252/301.1 |
| 3,347,798 | 10/1967 | Baer et al. | 176/1 |
| 3,620,835 | 11/1971 | Drittler et al. | 427/6 |
| 3,697,329 | 10/1972 | Bunker et al. | 176/91 SP |
| 3,704,202 | 11/1972 | Reeve et al. | 176/91 SP |
| 3,953,617 | 4/1976 | Smith et al. | 176/1 |
| 3,978,269 | 8/1976 | Martin | 428/404 |
| 4,039,297 | 8/1977 | Takenaka | 428/406 |

FOREIGN PATENT DOCUMENTS 824119 1/1975 Belgium .

OTHER PUBLICATIONS

Physics Today, 3/75, pp. 17, 20.
Nuclear Fusion, 4/75, pp. 333, 334.
"Exploding Reactors for Power", Marwick, 1/73, p. 38.
Science, vol. 186, 11/74, p. 519.
Reactor Materials, vol. 6, No. 2, 5/63, Oxley(I), pp. 1-14.
J. of Nuclear Materials, vol. 11, 1964, pp. 1-31, by Dayton et al.
Science, vol. 188, 4/75, pp. 30-34.
Nuclear News, 5/75, pp. 79, 80.
ERDA-28, 1/75, pp. 1-3, 8-10.
NSENAO-58, No. 2, 10/75, pp. 107, 108, 118, 119.

Primary Examiner—Harvey E. Behrend
Attorney, Agent, or Firm—Cruzan Alexander; Donald M. Sell; William B. Barte

[57] ABSTRACT

Smooth-surfaced, free-flowing, rigid, spherical, hollow microcapsules having non-porous shell walls consisting of essentially homogeneous, non-vitreous metal oxide in predominantly polycrystalline state, which have at least one shell having over the entire outer surface thereof one or more coatings of material of the class consisting of ceramic oxide, metal or pyrocarbon, which contain for storage and transport within said shell or shells preselected gases, solids or liquids suitable for use in fusion targets are described together with methods for their production.

11 Claims, 9 Drawing Figures

MULTISHELL MICROCAPSULES

This invention relates to ceramic microcapsules containing certain materials in solid, liquid or gaseous form. The capsules are suitable for storage and transport of preselected compositions enabling the use thereof as targets in devices in which energy beams are caused to bring about fusion reactions.

Energy from laser beams or electron beams can be used to heat gas-filled glass so-called "microballoons" to bring about extremely high temperatures and pressures inside the microballoon, and reportedly thermonuclear reactions have been obtained by laser beam impingement on deuterium- and/or tritium-filled glass microballoons under certain conditions. However, for such a reaction to bring about release of useful, practical amounts of energy over and above the amount of energy employed in causing the reaction, so as to be available for generation of electricity, etc., it is necessary that the gas be compressed until the pressures in the microballoon region become extremely high and that the reaction take place in such a short period of time that significant expansion of the gas does not take place before net fusion energy is liberated. With the glass microballoons hitherto available to the prior art, it is believed that the necessary conditions of pressure, temperature and confinement time have made it difficult to achieve practically useful amounts of energy.

The present invention aims to provide a target microcapsule which has features that enhance implosion. Rather than making ever more powerful lasers to develop ignition conditions, it is believed to be possible to make more complex targets which will have auto-energetic character. This invention is directed to target particles in which the laser will set off an outer region thermonuclear reaction of low efficiency and this, in turn, by implosive force, will develop compression thereby yielding more favorable conditions for a high efficiency reaction which will develop in the inner region of the target.

For a D, T (deuterium-tritium) reaction, this inner region must reach a temperature of about 100 million degrees Kelvin and the D, T particles must be confined therein for about $10^{-12}$ seconds. There is no existing laser known to us to be capable of delivering the energy necessary to heat and compress D, T as required.

In a simple target of normal density ($\rho \simeq 1$), and a few hundred micrometers radius, the inertial confinement time at $10^{8\circ}$ K. is about $10^{-10}$ seconds. The confinement time is proportional to the radius divided by the thermal velocity of the atoms. Thus, the atoms in the microcapsule would fly apart in that short a time. The time for fusion to occur (inversely proportional to target density) in such a pellet is about b $10^{-7}$ seconds, so that the yield or efficiency of this reaction is low ($\sim 0.1\%$). If a ten fold compression were made by a suitable implosion, the 10X radius decrease shortens the inertial confinement time by 1/10 to $\sim 10^{-11}$ seconds. The density is increased, however, by 1,000 fold (radius cubed) and the fusion time is now $\sim 10^{-10}$ seconds, giving an efficiency of 10% ($10^{-11}/10^{-10}$). In addition, the free path or range of the products of a D, T reaction (neutrons, $\alpha$ particles and target material atoms) is also inversely proportional to the density. Before compression, this path would be manyfold the target diameter and very few collisions occur. At a compression of 1,000 to 10,000 fold or more, the free path for $\alpha$ particles and the heavier target material atoms is much less than the target diameter. The free path for neutrons is about equal to the target diameter. Thus, with the high energy particles colliding within the compressed region, a thermonuclear burn front will occur. Much less energy is needed to achieve compression than ignition. (Several orders of magnitude less.)

In one embodiment of the present invention, the microcapsule is provided with an outer shell or coating of tungsten and is designed store and transport the composition contained therein until it is struck by pulsed ($<1$ nanosecond) high energy laser beam(s) of the order of 1,000–5,000 joules. The D, T in the outer region of the microcapsule ignites at low efficiency and, aided by the inertial mass of the tungsten outer shell, creates an implosive force on the inner D, T region. The densified plasma will absorb still more laser energy and there will be a thermonuclear burn front of increasing efficiency as the more central region reacts. With optimum design of the microcapsule, the target material will yield output energy greater than input.

The microcapsules of the present invention differ significantly from the glass microballoons hitherto used or proposed for the purpose of studying release of fusion energy. Glass balloons are vitreous and, as made using melt processes known to the prior art, cannot contain the deuterium or tritium gases heretofore used or proposed in a pure form because to introduce the fill gas, it is necessary to cause diffusion of the gas through the walls of the glass microballoons, displacing the contents. The gases initially contained in the microballoons are never fully displaced. In addition, the microcapsules in this invention can be made having one capsule within another, allowing for reactants in the annular space which can provide additional compression on the innermost capsule.

The present invention provides smooth-surfaced, free-flowing, rigid, practically spherical, hollow microcapsules having at least one non-porous shell wall of substantially uniform thickness consisting of essentially homogeneous, non-vitreous ceramic metal oxide in predominantly polycrystalline state, containing a preselected composition in gaseous, liquid or solid form, the wall being enclosed by one or more coatings of material of the class consisting of ceramic oxide, metal or pyrocarbon; or having one or more additional shell walls concentric with the first mentioned wall of the microcapsule and spaced more or less uniformly therefrom, also consisting of the same or different essentially homogeneous, non-vitreous metal oxide in predominantly polycrystalline state. Optionally said additional shell walls have a coating or coatings over the outer surface thereof of a layer of material of the class consisting of ceramic oxide, metal or pyrocarbon. The coating enhances the sealing and/or provides added strength or other advantages. In an intermediate stage in the process of making the microcapsules, these shells are porous, and the spaces contained within the microcapsules can be filled with the preselected composition, i.e., a liquid, gaseous or solid material. In their ultimate form, they are sealed, non-porous and retain the contents of the shells over a substantial period of time, enabling the storage and transport of the contents.

As used in this application, the term "microcapsule" means a unicellular, hollow particle having a peripheral wall or shell enclosing or surrounding a single hollow cavity within the interior of the particle, and which may have one or more concentric shells overlying and spaced apart from each other so as to provide microcapsules which may be viewed as themselves encapsulated.

The microcapsules of the invention have diameters ranging from 1 to 1,000 microns, and wall thickness of from 0.1 to 100 microns, the larger diameter microcapsules having the thicker walls. When multiple shell walls spaced apart from each other are employed, the ultimate diameter of the microcapsules can be up to 2,000 microns.

A microcapsule described herein as "spherical" is one having the shape of a true sphere, or being spherical, e.g. like a sphere but oblate or prolate. A microcapsule characterized herein as being in "porous" condition is one whose wall has interconnected submicroscopic pores or passages and is permeable to liquid and/or gas. An "impermeable" capsule is one whose wall is sealed, non-porous and closed so as to retain the contents within the interior portion or cavity of the microcapsule.

Microcapsules characterized herein as having "homogeneous" walls are those, the walls of which when examined under an optical microscope at e.g. magnifications of e.g. 140× are found to be completely or essentially free of discernable extraneous inhomogeneities, such as pores, voids, occlusions, inclusions or dispersions.

The "predominantly polycrystalline" metal oxide material of the microcapsule shell has a sufficient degree of crystallinity or microcrystallinity so that the crystalline species thereof can be discerned or identified by conventional x-ray or electron diffraction techniques, but they may contain a small amount of amorphous material. The presence of such amorphous material is believed to be beneficial in providing improved sealing of the microcapsule shell, for retention of gaseous contents. The shells of the microcapsules of this invention are in any case to be distinguished from vitreous materials such as glass, which, in addition to being similar to completely amorphous material is a material which is derived from a melt.

The microcapsules of the present invention are made of a non-melt process comprising steps of liquid-liquid extraction, drying, firing, filling, sealing, coating and overcoating, without requiring leaching, gas blowing or expanding means to form the cavities inside of the microcapsules.

Figure 1:
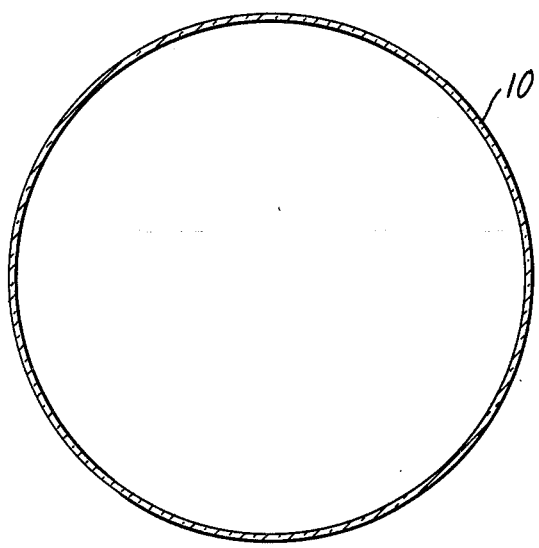
FIG. 1 is a cross-sectional view of a microcapsule used according to Example 1.

Broadly speaking, the microcapsules are produced by forming droplets of an aqueous solution, dispersion or sol of one or more metal oxides, metal compounds calcinable to metal oxides, or mixtures thereof in a dehydrating liquid, preferably a liquid in which water has limited solubility. The water is extracted from around the droplets to form discrete, dispersed, liquid-filled microcapsules having a porous gelled wall or shell. The liquid inside the microcapsules during the process of their formation is the dehydrating liquid. The size of the microcapsules thus formed is controlled by concentration of solids and agitation of the dehydrating liquid as the solution or dispersion of ceramic oxide-forming material is poured into it. The gelled, porous, liquid-filled microcapsules are recovered from the dehydrating liquid as by filtration, screening or decanting and are then rendered solvent-free (i.e. "dried" to remove residual dehydrating liquid or the like from the exterior and the liquid from within the microcapsules) to form green, porous, air-filled microcapsules. This drying step which comprises removal of solvent is ordinarily accomplished under ambient temperature and pressure conditions are relatively low temperatures.

The green microcapsules thus formed are pre-fired at a temperature of the order of about 250°-500° C., to produce porous, transparent ceramic microcapsules consisting of essentially polycrystalline metal oxide containing the ambient atmosphere. At this point, the microcapsules can be filled with the desired material, as by subjecting them to high vacuum conditions to remove the original gas content, then backfilling with e.g. a desired gas such as deuterium or tritium or a mixture thereof, or liquids, or solids in molten form at temperatures below about 500° C. Thereafter, the capsules are again fired at higher temperatures ranging from about 500°-1300° C., under pre-selected pressure, to seal the walls of the microcapsules around the pre-selected fill material.

This provides a means of producing microcapsules containing high-purity fill materials uncontaminated by residual manufacturing materials.

The aqueous precursor material used to form the microcapsules of this invention comprises an aqueous solution, dispersion or sol of one or more metal oxides or metal compounds calcinable to metal oxides, or mixtures of said forms of precursor materials. The precursor material should be pourable and stable, that is, non-gelled, non-flocculated or non-precipitated. The equivalent concentration of the metal oxide in the precursor material can vary widely, e.g. a few tenths of one weight percent to 40 or 50 weight percent, and the particular concentration chosen will be dependent on the particular form of the precursor metal oxide and dehydrating liquid used and the desired dimensions and proposed utility of the microcapsules. Generally this concentration will be that sufficient to promote rapid formation of droplets in the dehydrating liquid, and generally the lower the equivalent concentration of metal oxide in the precursor materials, the thinner the walls and the smaller the diameters of the microcapsules.

The aqueous precursor can be a dispersion or sol of one or more (e.g. one to five or more) ceramic metal oxides, i.e. metal oxides which can be fired into a rigid or self-supporting polycrystalline form and are stable in a normal air environment, e.g., 23° C. and 50 percent relative humidity. Useful representative ceramic metal oxides include $TiO_2$, $Cr_2O_3$, $WO_2$, $ThO_2$, $Fe_2O_3$, $MgO$, $Y_2O_3$, $ZrO_2$, $HfO_2$, $V_2O_5$, $Nb_2O_5$, $UO_2$, $BeO$, $CoO$, $NiO$, $CuO$, $ZnO$, $In_2O_3$, $Sb_2O_3$, $Al_2O_3$, $SnO_2$ and mixtures thereof such as $ZnO-TiO_2$, $TiO_2-Fe_2O_3$, $SnO_2-TiO_2$, $Nb_2O_3-TiO_2$, $Al_2O_3-Cr_2O_3$, $MgO-Al_2O_3$, $MgO-TiO_2$, $MgO-ZrO_2$, $ThO_2-UO_2$, $ThO_2-CeO_2$, $Be_2O_3-TiO_2$, $BeO-Al_2O_3$, $TiO_2-Fe_2O_3$, $Al_2O_3-Cr_2O_3-Fe_2O_3$, $PbO-ZrO_2-TiO_2$, $ZnO-Al_2O_3-Cr_2O_3$, $Al_2O_3-Fe_2O_3-TiO_2$ and $ThO_2-Al_2O_3-Fe_2O_3-TiO_2$. It is also within the scope of this invention to use dispersions or sols of said ceramic metal oxides in combination or admixture with dispersions or sols of one or more metal oxides which are unstable in normal air environment (such as $Li_2O$, $Na_2O$, $K_2O$, $CaO$, $SrO$ and $BaO$) and/or ceramic non-metal oxides having an atomic number of 14 or greater (such as $SiO_2$, $As_2O_3$ and $P_2O_5$), representative combinations including $Al_2O_3$—$Li_2O$, $TiO_2$—$K_2O$, $ZrO_2$—$CaO$, $ZrO_2$—$Al_2O_3$—$CaO$, $ZrO_2$—$SrO$, $TiO_2$—$BaO$, $TiO_2$—$ZrO_2$—$BaO$, $Al_2O_3$—$NaO$, $MgO$—$SiO_2$, $Fe_2O_3$—$BaO$, $ZrO_2$—$SiO_2$, $Al_2O_3$—$SiO_2$, $Al_2O_3$—$B_2O_3$—$SiO_2$ and $Al_2O_3$—$Cr_2O_3$—$SiO_2$. Thus, the ceramic shells of the microcapsules of this invention consist, consist essentially of, or comprise polycrystalline ceramic metal oxide (or amorphous ceramic metal oxide convertible thereto by firing), the "ceramic metal oxide" including systems of said oxides in free or combined forms.

A number of the above-described oxides useful in this invention are commercially available in the form of aqueous sols or dry powders which can be readily dispersed in water to form sols, such as $Al_2O_3$, $Cr_2O_3$ and $Fe_2O_3$ sols sold under the trademark "Nalco", silica sols sold under the trademarks "Nalco", "Ludox", "Syton" and "Nyacol", and $Al_2O_3$ colloidal powder sold under the trademark "Dispal".

Instead of using the precursor material in the form of dispersion or sols of said oxides, it is within the scope of this invention to use the precursor material in the form of water-soluble or dispersible inorganic or organic compounds which are calcinable to the corresponding oxide. These compounds representatively include many carboxylates and alcoholates, e.g. acetates, formates, oxalates, lactates, propylates, citrates and acetylacetonates, and salts of mineral acids, e.g. bromides, chlorides, chlorates, nitrates, sulfates and phosphates, selection of the particular precursor compound being dictated by availability and ease of handling. Representative precursor compounds useful in this invention include ferric chloride or nitrate, chromium chloride, cobalt nitrate, nickel chloride, copper nitrate, zinc chloride or carbonate, lithium propylate, sodium carbonate or oxalate, potassium chloride, beryllium chloride, magnesium acetate, calcium lactate, strontium nitrate, barium acetate, yttrium bromide, zirconium acetate, hafnium oxychloride, vanadium chloride, ammonium tungstate, aluminum chloride, indium iodide, titanium acetylacetonate, stannic sulfate, lead formate, antimony chloride, cerium nitrate, neodymium chloride, phosphoric acid, cerium chloride, uranium nitrate and thorium nitrate.

The preferred form of the precursor materials used in making microcapsules composed of a single metal oxide composition is an aqueous sol of the metal oxide. Where the microcapsules are composed of two oxides, the precursor material can be a mixture of an aqueous sol of each oxide or an aqueous solution of one oxide or its precursor with an aqueous sol of the other oxide precursor. Where microcapsules composed of a major amount of one oxide and a minor amount of another oxide are desired, the precursor of the major oxide is generally preferably in the form of an aqueous sol. In general, the form of the particular precursor to be used will be dictated by its availability and ease of handling. For example, the precursors of alumina, titania, chromia and silica are preferably in the form of aqueous oxide sols, and the precursors of lithia, calcia, magnesia and baria are preferably aqueous solutions of their soluble salts.

The preparation of dispersions, sols and solutions useful in the practice of this invention will be omitted in the interest of brevity since it will be within the skill of the art to prepare such materials, representative teaching in the art for this purpose being U.S. Pat. No. 3,709,706 and U.S. Pat. No. 3,795,524. It is desirable to filter the aqueous precursor materials before use.

Where microcapsules composed of two or more oxides are to be made, e.g. binary, ternary and quaternary oxide compositions, the overall precursor material will contain sufficient amounts of the individual precursors to impart desired properties to the microcapsules. For example, where microcapsules are desired having magnetic properties of lower degree than obtained from microcapsules having shells composed only of iron oxide, the precursor material will comprise aqueous ferric nitrate admixed with a sufficient amount of titania, alumina or silica aqueous sol to obtain the desired lower degree of magnetic properties.

The dehydrating liquid used to dehydratively gel the precursor material is preferably a liquid in which water has a limited solubility and in which water is miscible to a limited extent. Such a dehydrating liquid will practically instantaneously cause formation of liquid droplets of the precursor material and rapidly extract the major amount of the water from the droplets to form discrete, dispersed, liquid-filled microcapsules having a porous gelled wall or shell, the physical integrity of which is maintained in the body of dehydrating liquid. The formation of a substantially quantitative yield of gelled microcapsules is complete within 30 seconds. Further, this formation does not require heating (i.e., it can be accomplished at ambient room temperature, e.g. 23° C.) nor does it require use of a barrier liquid. Though a small amount of solid beads may also be formed, the predominant amount, i.e., at least 85–89 percent or higher, of the microparticles formed will be in the form of microcapsules. If the liquid-liquid extraction is carried out in a batch operation, there may be a tendency to form said small amount of solid beads (or relatively thicker-walled microcapsules) toward the end of the extraction due to the progressively decreasing dehydrating ability of the dehydrating liquid as it extracts the water from the precursor material.

Generally, dehydrating liquids useful in the practice of this invention preferably will have a limited solubility of about 3 to 50 weight percent, preferably 15 to 40 weight percent for water (based on the weight of the dehydrating liquid) at 23° C. Representative organic dehydrating liquids useful in this invention are alcohols, such as alkanols with 3 to 6 carbon atoms, e.g. n-butanol, sec-butanol, 1-pentanol, 2-pentanol, 3-methyl-2-butanol, 2-methyl-2-butanol, 3-methyl-3-pentanol, 2-methyl-1-propanol, 2,3-dimethyl-2-butanol and 2-methyl-2-pentanol, cyclohexanol, ketones such as methyl ethyl ketone, amines such as dipropylamine, and esters such as methylacetate, and mixtures thereof. Some of these dehydrating liquids, e.g. n-butanol, when used to form microcapsules with relatively large diameters, e.g. 100–500 micrometers or larger, may have a tendency to cause micro-cracks in the shells of the microcapsules. Such micro-cracks can be prevented or minimized when such dehydrating liquids are used to form large microcapsules by adding a small amount of water to such dehydrating liquid. However, the resulting water-dehydrating liquid mixture still has said limited solubility for water, preferably at least 15 weight percent.

If a dehydrating liquid with a water solubility of less than about 3 weight percent is used, such as 2-ethyl-1-hexanol per se, the rate of extraction from the droplets of precursor material will be relatively slow, e.g. complete extraction will be longer than one minute, and even as long as 10 minutes or more, and the gelled precursor will be in the form of solid microspheres (or beads). However, dehydrating liquids with said low water solubility, e.g. 2-ethyl-1-hexanol, can be used in combination with those aforementioned dehydrating liquids having greater water solubility, e.g. 15 to 50 weight percent, to form the microcapsules of this invention. For example, 2-ethyl-1-hexanol has a relatively higher boiling point than n-butanol, and when a mixture of 5 to 20 weight percent of the former and 80 to 95 weight percent of the latter is used, the economics of the extraction operation are improved in that losses of the alcohols due to volatilization are decreased. Although the precursor material can be first injected into 2-ethyl-1-hexanol to form droplets and then a small amount of a completely water-miscible solvent such as methanol added, the bulk of the gelled microparticles formed will be solid beads with a low yield of porous, liquid-filled microcapsules. A good yield of porous, liquid-filled microcapsules can be formed by mixing the precursor material with a small amount of a completely water-miscible liquid, such as methanol, and then injecting the mixture into a liquid with low water solubility, such as 2-ethyl-1-hexanol.

If a dehydrating liquid is used which has unlimited solubility in water and is completely miscible therewith, as in the case of methanol or ethanol, neither microcapsules nor solid beads are formed, and in most cases the precursor material in effect is merely diluted or further dispersed by such dehydrating liquid.

The liquid-liquid extraction step of this invention can be carried out at ambient temperatures, e.g. 20°–40° C.; higher temperatures, e.g. 60° C. and higher, cause fragmentation of the gelled microcapsules. Excellent, substantial, quantitative yields, e.g. 95 percent and higher, of gelled microcapsules, based on the equivalent oxide solids content of the precursor material, can be conveniently achieved at room temperature (23° C.). In order to quickly and efficiently dehydratively gel the droplets of the precursor material in a batch operation, the body of dehydrating liquid is preferably subjected to externally applied agitation (e.g. by swirling the body of dehydrating liquid or by inserting a stirrer therein) when the precursor material is added thereto, and said agitation is continued during the course of dehydration of the resultant droplets of precursor material. This agitation maintains the droplets in suspension (and thereby prevents agglomeration and settling of the droplets) and ensures maintenance of relatively anhydrous dehydrating liquid in contact with the surface of the droplets as they are dehydrated. In a continuous liquid-liquid extraction operation, equivalent agitation can be accomplished by adding the precursor material at a point to a stream of the dehydrating liquid flowing at a sufficient rate to maintain the droplets in suspension in the course of their dehydration.

The dehydration of the droplets to form the gelled microcapsules will be sufficiently complete within 30 seconds, and usually in less than 15 seconds, from the time of addition of the precursor material, that addition being in the form of drops, flowing stream or by bulk.

The size of the droplets, and consequently the size of the resultant gelled and fired microcapsules, will be influenced by the degree or type of agitation of the dehydrating liquid as the precursor material is added thereto. For example, with high shear agitation, e.g. that obtained with a Waring Blender, relatively tiny droplets (and gelled microcapsules) can be formed, e.g. with diameters less than 20 microns. In general, gelled microcapsules with diameters in the range of about 1 to 2000 micrometers can be produced in accordance with this invention.

The gelled, porous, transparent, liquid-filled microcapsules can be separated and recovered from the dehydrating liquid in any suitable manner, e.g. by filtration, screening, decanting and centrifuging, such separation being preferably performed soon after completion of the extraction step. Where the gelled microcapsules are recovered by filtration, filter cake comprising said microcapsules and residual dehydrating liquid is obtained. In any event, the recovered mass of gelled microcapsules are then sufficiently dried to remove the residual dehydrating liquid and the liquid within the microcapsules, the resultant dried, gelled microcapsules being conveniently referred to herein as green microcapsules, i.e. dried and unfired. Said drying can be accomplished in any suitable manner, care being exercised to prevent too rapid an evaporation in order to minimize cracking or bursting of the microcapsules. This drying can be carried out in ambient air and pressure in a partially enclosed vessel at temperatures, for example, of 20°–25° C. Higher or lower drying temperatures can be used with commensurate adjustment of pressure if necessary to prevent fracture of the wall of the microcapsules. During the course of drying, the liquid within the microcapsules diffuses through the shell or wall of the microcapsules, as evidenced by microscopic observation of the retreating upper surface or meniscus of the liquid within the transparent microcapsules, thus attesting to the porous nature of the gelled microcapsules. The larger the dried microcapsules are, the more freeflowing they are. The dried microcapsules have sufficient strength to permit subsequent handling. It may be desired to screen-classify them to obtain desired size fractions.

The dried microcapsules are then fired to convert them to spherical, smooth-surfaced, light weight or low density, rigid, crushable microcapsules, the shell of which is non-vitreous, synthetic, ceramic, homogeneous, preferably transparent and clear, and comprises metal oxide which is polycrystalline or is amorphous metal oxide convertible to polycrystalline metal oxide upon firing at higher temperature. Depending upon the particular oxide precursor material and firing temperature used, the walls of the fired microcapsules will be porous and heat-sealable or impermeable, the metal oxide in the walls being present in whole or in part in the polycrystalline state or in an amorphous state capable of conversion upon further firing to the polycrystalline state. For example, dried, gelled microcapsules made from $Al_2O_3$—$B_2O_3$—$SiO_2$ precursor material can be prefired at 500° C. to produce porous, transparent, ceramic microcapsules comprising amorphous $Al_2O_3$—$B_2O_3$—$SiO_2$, which can be further fired at 1000° C. to form impermeable, transparent, ceramic microcapsules comprising polycrystalline aluminum borosilicate and an amorphous phase. As another example, dried, gelled microcapsules made from $TiO_2$ precursor material can be prefired at 250°–450° C. to produce porous, transparent, ceramic microcapsules consisting of polycrystalline anatase $TiO_2$, and these microcapsules can be further fired to or at 700° C. to form impermeable, transparent, ceramic microcrystals consisting of anatase titania $TiO_2$, and even further fired at 800° C.

to form impermeable, ceramic microcapsules consisting of polycrystalline rutile $TiO_2$. The dried, gelled microcapsules can be fired in one step directly to impermeable microcapsules.

In most instances, the crystallites in the polycrystalline metal oxide are less than 2000 Angstroms and usually (and preferably for purposes of transparency) less than 1000 Angstroms. However, crystallites up to 20,000 Angstroms or higher, for example, can be obtained in the same precursor materials, e.g. $Fe_2O_3$ microcapsules with such large crystallites appearing grainy under a microscope (e.g. 140×).

In general, the particular firing temperature used to convert dried and gelled (or "green") microcapsules into first porous and then sealed ceramic microcapsules will be dependent on the particular precursor material used and the particular physical and compositional properties desired in the ceramic microcapsules and the intended utility thereof. Generally, the firing temperatures selected for these steps will be in the range of the order of 250°–500° C. and 500°–1300° C.

Although firing of the microcapsules to the impermeable state results in some densification of the walls, accompanied by some shrinkage and a slight decrease in diameter, the size or size distribution of the fired microcapsules is controlled as a practical manner in the extraction operation as discussed aove, and thus the diameters of the fired microcapsules will be in the range of about 1 to 2000 micrometers. The wall of the fired microcapsule will be uniformly thick and in the range generally of 0.1 to 100 micrometers. The fired microcapsules can also be separated into desired size fractions by screen or air classification, elutriation, etc., and any solid microparticles, beads and fragments of broken microcapsules can be separated by flotation or winnowing techniques.

The firing step can be carried out in an atmosphere that will not be detrimental to the conversion of the gelled microcapsules to the desired ceramic microcapsules. An air atmosphere will generally be useful. A hydrogen or other reducing atmosphere can be used where desired to form ceramic microcapsules comprising reduced metal oxides, e.g. FeO, or metals, e.g. Fe. Atmospheres such as argon, nitrogen, xenon, neon or hellium can be used, particularly where it is desired to form ceramic microcapsules with such atmospheres or when materials with oxygen or hydrogen are to be filled and heat-sealed therewith. Generally, where it is desired to form sealed ceramic microcapsules with a vacuum or select gas (other than air) encapsulated therein, it will be convenient to use an air atmosphere in the step of conversion of the dried, gelled microcapsules to porous ceramic microcapsules and then to heat-seal the latter in a vacuum or an atmosphere of the selected gas.

The pressure within the sealed microcapsules containing gas will be dependent upon the temperature at which sealing is accomplished and the pressure applied to the selected gas at that temperature. Thus, the pressure within the sealed microcapsules can be varied over a wide range, from subatmospheric to super-atmospheric, and predetermined and calculated according to the gas laws. This process allows the encapsulation of very pure gases and pre-selected mixtures of gases.

In firing the dried, gelled microcapsules, care should be exercised to avoid ignition of combustible material in or evolved from the green microspheres. Said ignition may cause localized or general overheating which may cause rupture of the microcapsules or undesirable changes in the properties of the microcapsules such as loss of transparency and strength. For example, ignition can be avoided by starting the firing at a low temperature and then elevating the temperature at a slow rate. It may be necessary to facilitate removal of combustible material by limiting the depth of the bed of microcapsules and/or by maintaining a gentle air flow over or through the bed.

Where it is desired to fill the microcapsules with a liquid, e.g. for purposes of storing said liquid and releasing the same if and when desired, the fired, porous microcapsules can be first evacuated in a suitable evacuation chamber to which the liquid is then introduced to substantially fill the microcapsules, pressurization being used if necessary. Particularly useful liquids are the wholly or partially tritiated or deuterated hydrocarbons e.g. $C_nT_{2n+2}$ or $C_nD_{2n+2}$ or mixtures thereof. A suitable amount of gas is permitted to remain in the capsule to provide for expansion space when the microcapsules are heated. This is readily accomplished by subjecting the porous microcapsules to pressures reduced e.g. to one-half of atmospheric pressure before filling with liquid. The liquid-containing microcapsules can be separated from any excess of the liquid, e.g. by filtration, and the filled microcapsules then sealed.

One technique which can be used to seal the liquid-filled microcapsules is by coating them with a suitable coating which is thereafter evaporated, leaving a thin, impervious, sealing film of the polymeric material on the exterior of the filled microcapsules, e.g. as disclosed in U.S. Pat. No. 3,117,027, issued Jan. 7, 1964 to J. A. Lindlof and D. E. Wurster, or U.S. Pat. No. 3,196,827, issued July 27, 1965 to D. E. Wurster et al. The thus coated capsules are dropped through a heated zone in a tube furnace, the said zone being at a temperature in the range of about 100° C. The polymer volatilizes and substantially simultaneously the shells are rapidly heated to a temperature sufficient to seal the pores without volatilizing the liquid content. Especially useful liquid fill materials are deuterated or tritiated hydrocarbons having from 1 to 20 carbon atoms. Thus, a microcapsule substantially completely filled with fully deuterated or tritiated hexane or heptane would contain as much deuterium or tritium as a microcapsule of the same size containing gaseous deuterium or tritium at about 40 atmospheres pressure.

The porous fired microcapsules (depending upon the size of the pores) can be partially or substantially filled with various selected solids. For example, a low-melting solid can be heated to its melting point (e.g. acetamide) and the resulting liquid pressurized into evacuated porous fired microcapsules. After cooling, the excess solid can be removed from the exterior of the microcapsules by washing with a solvent. Subsequently, the filled microcapsules can be sealed, if desired, by the coating technique described above.

A particularly advantageous solid fill material can be introduced by first melting lithium and causing the capsules to be filled partially with the liquid metal. Deuterium is introduced and reacts with the lithium to form lithium deuteride.

Another alternative utilizes a solution of a salt or compound (e.g. lithium in liquid ammonia) which deposits solid lithium within the microcapsule upon evaporation of the ammonia. Repeating this cycle adds additional quantities to the interior of the microcapsule. Similarly, a solution of a lithium borodeuteride or tritide in ether can be utilized for the purpose.

An additional method of filling a porous microcapsule involves metathesis or precipitation reactions. Microcapsules can be partially filled with a solvent containing a salt (e.g. aqueous $Cd(NO_3)_2$), followed by further filling of the capsule with a gaseous reactant (e.g. $H_2S$) which contains ions required to precipitate the desired compound (e.g. CdS).

The microcapsules of the invention, after filling with a liquid, solid or gas, as desired, are coated with a second coating of a material which enhances the sealing and/or provides added strength or other advantages. Such coatings are ceramic oxide coatings of the same type as employed for making the original microcapsule wall, pyrocarbon or metals.

In its simplest form, the microcapsule of the invention after filling with a pre-selected fill material by passage through the porous walls of the microcapsule after the first firing step, is further fired to seal the pores of the ceramic oxide wall structure. Thereafter, the microcapsules are coated with an aqueous sol of a metal oxide or mixture of oxides, selected from the group of such materials set forth hereinabove, or with a water-dispersible inorganic or organic compound calcinable to the corresponding oxide, also as set forth hereinabove. This coating can be accomplished by preparing the amount of aqueous sol necessary to coat the walls of a given weight of capsules to a predetermined thickness, and employing approximately that amount of the selected sol material for admixture with the microcapsules. The microcapsules and sol are thoroughly agitated until uniform coating is present on each one of the capsules, and then the sol-coated capsules are dispersed in a rapidly stirred dehydrating liquid, or in a mixture of a dehydrating liquid as set forth hereinabove with an inert liquid such as vegetable or mineral oil. In this way, the sol is dehydrated and a gel is formed covering the surface of the microcapsules. After coating, the dehydrated gel-coated capsules are dried and then fired as set forth hereinabove, to convert the gelled material to a transparent coating of ceramic oxide.

Alternatively, the microcapsules are covered with pyrocarbon, as by pyrolysis of a hydrocarbon gas or carbon monoxide, while the particles are under fluidized bed conditions in a vertical tube furnace or in a rotating kiln or the like. Such pyrocarbon coatings have been applied to tiny substantially spherical particles of uranium dicarbide adapted for use in nuclear reactors, particularly high-temperature gas-cooled reactors, as fissionable fuel. Such coatings and the processes for their formation are disclosed e.g. in U.S. Pat. No. 3,163,609 and U.S. Pat. No. 3,129,188. Encasement of such small particles by pyrocarbon coatings has been disclosed in U.S. Pat. No. 3,151,037. Suitable hydrocarbons for producing pyrocarbon coatings are methane, ethane, acetylene and the like, as well as carbon monoxide. The particles are maintained in a reaction zone heated to about 800°–1200° C., while agitating them in the presence of the said pyrolyzable material, preferably with dilution with an inert gas such as nitrogen or argon. In this way, a coating of pyrocarbon which may by crystalline, as pyrographite, or amorphous, is formed on the particles. By selecting conditions as known in the art, either soft, hard, porous or dense coatings of carbon can be placed upon the particles. Also, multiple layers of pyrocarbon, having different densities and crystallite formation in each layer, can be placed on the particles, also as is known in the art, as described in U.S. Pat. Nos. 3,247,008 and 3,298,921. Combination pyrocarbon and silicon carbide coatings on fissionable fuel particles are described in U.S. Pat. No. 3,249,509.

Metallic coatings are placed upon the microcapsules by electroplating or electroless plating methods, or by decomposition of metal carbonyls or complexes as shown hereinafter. Thus, coatings of nickel, silver, palladium, platinum, copper, tungsten, thorium and the like can be placed upon the microcapsules, to improve the strength thereof or to provide other advantageous properties. When iron, for example, is deposited on the surface of the particles, they can be handled magnetically, an advantage in dealing with such small particles.

A particularly advantageous form of the particle is that in which a second shell wall is formed around the original microcapsule, spaced apart therefrom and providing a second chamber into which the same or different gases or mixtures of gases, or liquids or solids, can be introduced. Such double-walled or multiple-walled capsules are formed e.g. by first coating the microcapsules containing the selected capsule content sealed therein as noted above, with a fugitive polymeric coating, such as nitrocellulose. Such coatings are readily applied from solution and can be made of any desired thickness from 1 to 10, 15 or more micrometers in thickness, by covering the surface of the microcapsules with the solution of polymer, and drying, this step being repeated several times if necessary to achieve the preselected thickness.

Desirably, ceramic filler materials such as short fibers of e.g. alumina, silica or the same metal oxide as that of the microcapsule shell wall e.g. of 1 to 5 microns diameter and 5 to 10 microns in length, or spheroidal beads or particles of ceramic oxide, are incorporated in the polymer solution in amount of about 1 to 5 percent and uniformly dispersed therein. After the polymer is removed as by firing in a later step of the procedure, such fillers remain and serve as spacers to hold the shell walls apart. The size of the filler material is selected so as to approximate the thickness of the polymer coating to be applied.

After the polymer coating has been placed upon the microcapsules, the coating is dried and a further coating of aqueous ceramic oxide gel of the same or different kind as that used in making the original microcapsule shell wall is placed directly upon the polymer coating. This is accomplished by the technique of employing just sufficient of the aqueous sol to coat the selected number of microcapsules to the desired thickness, as can be calculated, and after thoroughly mixing the microcapsules with the sol to coat all surfaces thereof, dehydrating the sol in the way set forth above to produce a gel coating on the microcapsules. After removal from the dehydrating liquid used to form the gel, the capsules are thoroughly dried and then fired at low temperature to produce a porous ceramic oxide coating. The fugitive polymer is volatilized or decomposed, and the volatile components escape through the pores of the outer ceramic oxide shell wall. The temperatures employed for this purpose are those set forth hereinabove. Some polymers, such as polycarbodiimides, decompose to leave a carbon skeleton at the temperatures used for the purpose of firing to form the first, porous shell wall. Such carbon skeletons serve to maintain the shell walls separated in concentric manner, while providing space for introduction of gases or liquids or solids, as set forth above in connection with the original microcapsules.

After the pre-selected substance has been introduced, a second firing at a higher temperature is employed to seal the walls of the outer microcapsule shell. If a carbon skeleton has remained, and the material introduced reacts with carbon at the temperatures employed for this purpose, the reaction product of course will be formed, and in many cases this may be desirable. In this way, for example, lithium carbide can be made an integral part of the microcapsule.

After forming the second shell wall in the way described above, separated from the original shell wall by a space, third and further shell walls can be constructed in the same manner, as desired. After the selected number of shell walls has been formed, the multiple-shelled capsule can be coated with pyrocarbon or metal, as set forth above. It will be apparent that an intermediate layer of metal, or of pyrocarbon, can also be imparted to the microcapsules, before a second or later shell wall is formed, or between the formation of shell walls, if desired. In this way, larger capsules can be formed having diameters of from 100 to 2,000 micrometers, while maintaining the essentially spheroidal form of the microcapsules. Such highly sophisticated multiple-walled capsules can have great strength.

Because of their high temperature stability or refractoriness, the ceramic microcapsules of this invention are useful in applications where high temperatures are encountered.

The capability of the microcapsules to be sealed lends itself to useful applications of the microcapsules in their filled form for storage of radioactive materials. The filled microcapsules can be used to store and transport the radioactive fill material.

The following examples will more specifically illustrate the sealed, coated microcapsules of the invention and the process for their manufacture.

EXAMPLE 1

A fresh titanium dioxide sol was prepared from 4.0 g. of titania gel (61.8 percent $TiO_2$) and 40 g. of distilled, deionized water. The mixture was filtered through a 0.3 micron diameter pore filter (Balston Type 95AA filter). The filtered sol was poured rapidly into a 1000 ml. flask containing a swirling mixture of 500 g. of n-butyl alcohol and 25 g. of distilled water. The swirling action was continued for two minutes and the mixture was then filtered by suction through No. 54 Whatman filter paper. The solid particles thus recovered were examined under a binocular microscope at 120× and found to be thin-walled, liquid-filled, spherical microcapsules about 50 microns in diameter. The liquid-filled microcapsules were transferred from the filter paper into a large, partially covered Petri dish. The liquid within the capsules gradually evaporated at room temperature from within the microcapsules indicating that the shell wall was porous. After 48 hours at 22° C., the dried microcapsules were examined by microscope. The microcapsules were free of cracks, substantially spherical, transparent and colorless, and free of the encapsulated liquid.

The dried microcapsules were fired in air from room temperature to about 350° C. for 30 minutes, and held at 350° C. for 30 minutes. The fired microcapsules were carefully removed from the furnace and cooled to room temperature.

The recovered rigid, crushable, smooth-surfaced, homogeneous, porous, transparent, clear, spherical microcapsules were placed in a vitreous silica tube located in an electric furnace. The open end of the tube was connected to a high vacuum system by a three-way valve, and the tube containing the porous microcapsules was evacuated to $5 \times 10^{-6}$ Torr. The tube and microcapsules were subsequently gradually heated to 350° C. and held at this temperature, with continuing evacuation for three hours. The pressure was maintained at about $5 \times 10^{-6}$ Torr. The valve to the vacuum system was closed off, and a mixture of deuterium-tritium gases was admitted to the vitreous tube at a slow rate. The pressure of the gas mixture was allowed to increase to four atmospheres over a period of about one hour, whereupon the microcapsules became filled with the gases. The tube was then gradually heated to 650° C. over about one hour and maintained at 650° C. for 15 hours. This firing step seals the pores in the microcapsules rendering them impervious to passage of gases. The system was subsequently allowed to cool, still under the atmosphere of deuterium-tritium. The residual mixture of deuterium-tritium was then evacuated from the system and subsequently back-filled with pure, dry nitrogen.

The microcapsules thus prepared are suitable for the storage of the deuterium-tritium gas mixture with which they were filled. They can also be used for further procedures in which additional shell walls and/or coatings are provided. A single wall microcapsule 10, as shown in FIG. 1, was thus produced.

EXAMPLE 2

For the preparation of microcapsules having a ceramic oxide coating over the original microcapsule shell, the following procedure is carried out:

A $TiO_2$ sol is prepared by mixing 2.0 g. of $TiO_2$ gel, 20 g. of absolute ethanol and 20 g. of distilled, deionized water. Reagent grade n-butyl alcohol (350 ml.) is measured into a 400 ml. beaker and stirred at 200 rpm with a 6.5 cm. diameter blade laboratory stirrer. Ten milligrams of the deutrium-tritium-filled $TiO_2$ capsules of Example 1 are placed in a small stainless steel scoop (2 mm. wide × 1 cm. long), and just enough of the previously-prepared $TiO_2$ sol is dropped onto the microcapsules to wet them. The scoop containing the wetted microcapsules is immediately lowered into the swirling n-butanol which disperses the capsules throughout the swirling mixture. The mixture is stirred for two minutes and then filtered by suction through a 1.5 micron pore size "Millipore" filter. The over-coated microcapsules are placed in a Petri dish and fired in an electric oven in air at 200° C. for 20 minutes, then the temperature is raised to 300° C. and held at that temperature for 20 minutes, then to 400° C. and held for 20 minutes. The fired microcapsules are removed from the furnace and cooled to room temperature. On microscopic examination they are clear, colorless, transparent, round, shiny and substantially spherical.

When sectioned after embedding in resin, a coating of substantially uniform thickness can be detected on the surface of the original microcapsules.

The green, porous ceramic oxide coating is sealed by a second firing at about 700° C. as described in Example 1.

Figure 2:
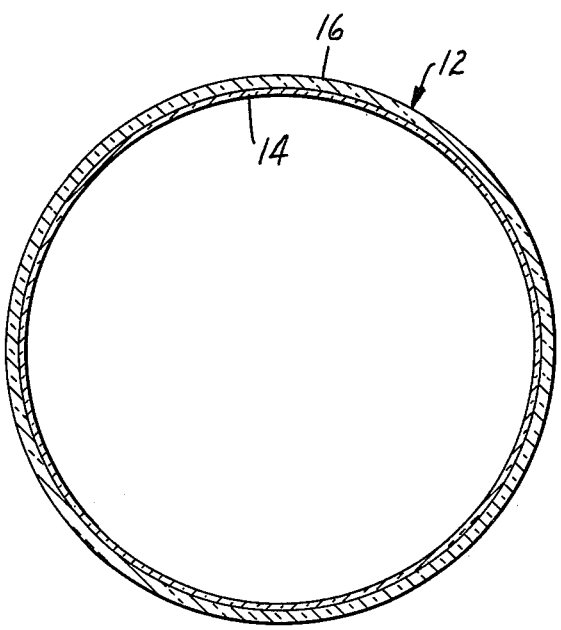
FIG. 2 is a cross sectional view of a microcapsule used according to Example 2.

As shown in FIG. 2, microcapsules 12 of $TiO_2$ having an outer coating 16 of $TiO_2$ in contact with and apparently adhered to the shell wall 14 are thus obtained.

Alternatively, a different ceramic oxide can be employed as a coating material.

A sol is prepared by mixing together 5.64 g. of aqueous solution of zirconium acetate (22 percent $ZrO_2$ equivalent), 2 g. of aqueous silica sol (Ludox LS, 30 percent $SiO_2$ equivalent), four drops of glacial acetic acid and 5 g. of water.

Microcapsules of $TiO_2$ prepared as described in Example 1 are coated with this sol as described in connection with $TiO_2$ coating as above, then placed in an agitated solution of 200 g. of n-butyl alcohol and 10 g. of water. After about one minute, the coated, transparent, spherical microcapsules are recovered by filtering through a No. 54 Whatman filter. The recovered coated microcapsules are dried in air at 95° C. for about one-half hour. The dried coated microcapsules are then fired in air from room temperature to 500° C. over a one hour period. The resulting ceramic microcapsules containing a deuterium-tritium mixture have an inner shell wall of $TiO_2$ coated with $ZrO_2$ and are rigid, crushable, smooth-surfaced, homogenous, clear, transparent and spherical.

EXAMPLE 3

For the preparation of microcapsules having an additional shell wall spaced apart from the original microcapsule shell, the following procedure is carried out:

Nitrocellulose (1.5 g., Hercules 7 second nitrocellulose, Grade A, Type 1, nitrogen 12.60 percent) was dissolved in 100 g. of analytical reagent grade ethylacetate by mixing with a magnetic stirrer for four hours at room temperature. Deuterium-tritium-filled and sealed $TiO_2$ microcapsules prepared according to Example 1 (100 mg.) were placed on a 9.0 cm. diameter Teflon filter disc (1.5 micron pore size). The disc was mounted in a suction filter arrangement, and 15 drops of the nitrocellulose solution were used to wet the microcapsules. A water aspirator was attached to the suction filter arrangement and a vacuum produced by water aspiration and allowed to aspirate the microcapsules for 30 minutes. This operation produced a solvent-free, continuous, homogeneous coating of cellulose nitrate on the surface of the $TiO_2$ microcapsules. The Teflon filter was deliberately stretched beyond its elastic limit to loosen the coated microcapsules from the filter surface. The coated microcapsules were allowed to roll off the surface of the filter into a small Petri dish. The coated microcapsules were examimed at 120× with a binocular microscope. The resulting microcapsules were smooth, round, colorless and covered with a uniformly thick (6 microns) coating of nitrocellulose.

Figure 3A:
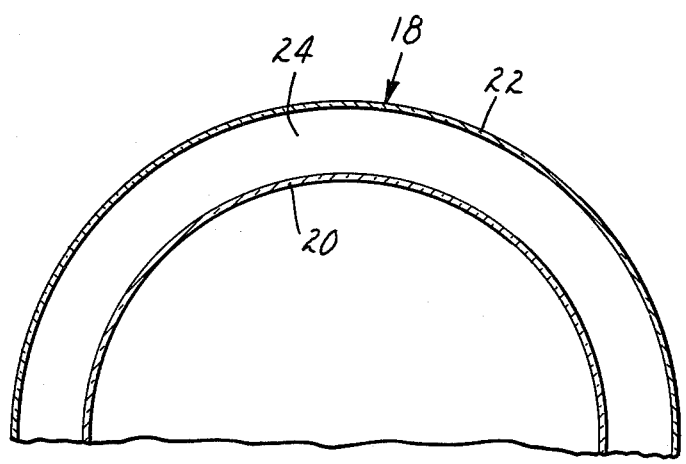
FIGS. 3a, 3b and 3c are partial cross-sectional views of microcapsules produced according to alternative teachings in Example 3.

A $TiO_2$ sol was prepared by mixing 2.0 g. of $TiO_2$ gel, 20 g. of absolute ethanol and 20 g. of distilled, deionized water. Reagent grade n-butyl alcohol (350 ml.) was measured into a 400 ml. beaker and stirred at 200 rpm with a 6.5 cm. diameter blade laboratory stirrer. Ten milligrams of the nitrocellulose-coated, deutrium-tritium-filled $TiO_2$ capsules were placed in a small stainless steel scoop (2 mm. wide × 1 cm. long), and just enough of the previously-prepared $TiO_2$ sol was dropped onto the mirocapsules to wet them. The scoop containing the wetted microcapsules was immediately lowered into the swirling n-butanol which dispersed the capsules throughout the swirling mixture. The mixture was stirred for two minutes and then filtered by suction through a 1.5 micron pore size "Millipore" filter. The microcapsules were dried on the filter for one hour. Microscopic examination (120×) revealed that the microcapsules were now uniformly coated over their entire surface with a clear, transparent, colorless, crack-free coating. The over-coated mirocapsules were placed in a Petri dish and fired in an electric oven in air at 200° C. for 20 minutes, then the temperature was raised to 300° C. and held at that temperature for 20 minutes, then the temperature was raised to 400° C. and held for 20 minutes. The fired mirocapsules were removed from the furnace and cooled to room temperature. The microcapsules were subjected to microscopic examination (120×), and the resulting microcapsules were found to be clear, colorless, transparent, round, shiny and substantially spherical. A portion of these microcapsules were embedded in resin, sectioned and examined by microscope. As shown in FIG. 3, the examination revealed double-walled, spherical microcapsules of $TiO_2$ 18, having inner and outer walls 20 and 22 respectively, separated by an interior spacing 24, with wall thicknesses of about 1.2 microns and about 73 micron outside diameter. The nitrocellulose coating had decomposed during the firing cycle, and the decomposition products were volatilized through the porous outer shell of $TiO_2$.

The double-walled microcapsules were placed in the same vitreous silica tube which was previously used to fill the inner microcapsules with deuterium-tritium mixture. The same procedure was followed to fill the space between the inner microcapsules and the outer shell walls with deutrium-tritium mixture, and subsequently the outer shell walls were sealed by firing the microcapsules at 700° C. as described previously.

Double-walled microcapsules thus prepared are not necessarily concentric with respect to the inner and outer shell walls. To aid in obtaining concentricity the nitrocellulose solution employed in the previous coating procedure is admixed with short, $TiO_2$ ceramic fibers prepared as disclosed in U.S. Pat. No. 3,030,183, such fibers, preferably having a diameter of the order of about 2 to 3 microns and a length not greater than 5 to 6 microns, are incorporated into the nitrocellulose in amount of about 1 to 5 percent, and uniformly dispersed therein by thorough mixing.

Figure 3B:
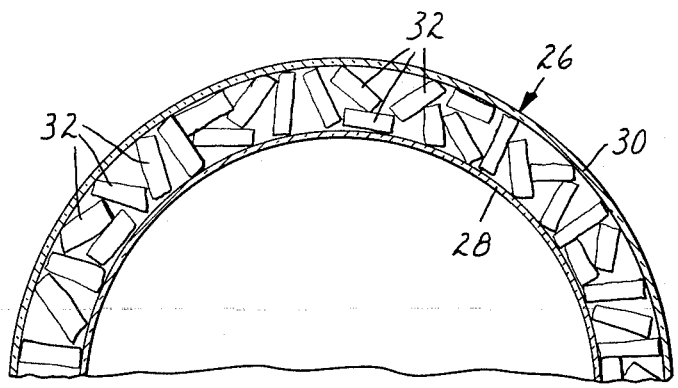

Accordingly, as shown in FIG. 3b, a microcapsule 26 comprising inner and outer spaced walls 28 and 30, respectively, within which FIGS. 32 are randomly positioned, will thus be produced.

Figure 3C:
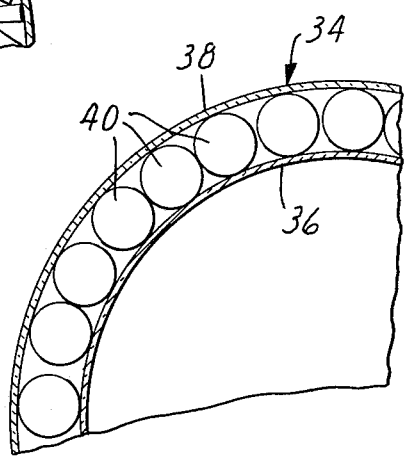

Alternatively as shown in FIG. 3c, microcapsules 34 having inner and outer spaced walls 36 and 38, respectively, and containing ceramic beads 40 having a diameter of the order of about 3 to 5 micrometers are employed. If the nitrocellulose solution is more concentrated, hence more viscous, a thicker layer will be added to the surface of the microcapsules being coated, and therefore, larger diameter ceramic beads, e.g. up to 10 micrometers in diameter, or somewhat longer microfibers are employed. When the nitrocellulose containing such uniformly dispersed filler materials is coated upon the surface of the microparticle, instead of plain nitrocellulose solutions, coatings containing such ceramic filler materials are obtained, in which these objects, which ultimately will function as spacers between the microcapsule shell walls, are dispersed fairly uniformly over the surface of the microcapsules and held in the nitrocellulose as a binder. The procedure set forth above is then followed to produce an additional $TiO_2$ shell wall around the nitrocellulose coating. Firing to eliminate the nitrocellulose leaves the ceramic spacers, which serve to hold the shell walls apart. Preferably, relatively few spacer elements are employed to avoid excessive strains, and to leave more available volume for introduction of gases.

EXAMPLE 4

Either the microcapsules having a single shell wall, as produced according to Example 1, or the microcapsules having one or more additional, concentric shell walls, as produced in Examples 2 or 3, can be additionally coated to provide other advantageous properties. Thus, for example, microcapsules prepared according to Examples 1, 2 or 3, containing a mixture of gases sealed within them, can be over-coated with a sol of a different, potentially ceramic oxide-forming material, using for example a different oxide such as aluminum oxide or iron oxide or other selected sol-forming salt or oxide.

Figure 4:
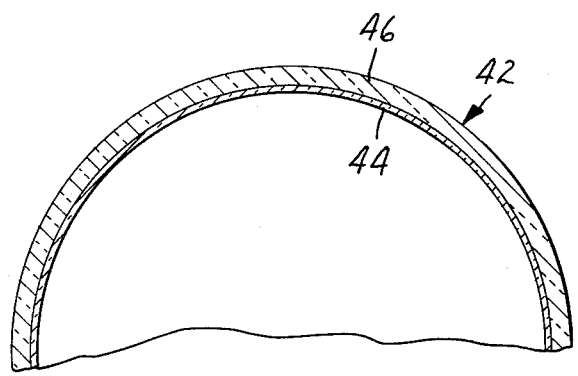
FIGS. 4, 5 and 6 are partial cross-sectional views of embodiments shown in Examples 4 through 6.

As shown in FIG. 4, such an overcoated capsule 42 may thus be prepared having inner shell 44 and an outer overcoat 46. Advantageously, such sols may also include or be composed of oxides of heavy metals, such as thorium, tungsten, chromium or the like. For producing the coating on the surface of the microcapsule, a sol is prepared by e.g. the method of U.S. Pat. No. 3,709,706, filtered, and the microcapsules are added to the sol in desired amount. Preferably, the amount of sol employed is smaller in volume than the amount of microcapsules, so as to produce a mass of microcapsules, each capsule being coated over its surface with a layer of the sol. The coated capsules are then dispersed in an inert liquid, e.g. mineral oil, and agitated so as to separate them from each other, and to permit the sol coating to form a uniform layer over the entire surface of the microcapsules. Thereafter, the dehydrating liquid which converts the sol to a gel coating, e.g. n-butanol, 2-methylhexanol, cyclohexanol or the like is added to the oil-microcapsule mixture. Relatively small proportions of the dehydrating material are added, to avoid cracking of the coatings as the water is withdrawn from the sol. After the coatings have gelled on the surfaces of the microcapsules, they are removed from the oil, washed with e.g. petroleum ether, and the washing fluid is permitted to evaporate from the surfaces of the coated microcapsules. The oil can also be removed by careful heating to avoid formation of carbon. The coated microcapsules are then fired to convert the coating into an impervious layer by firing at about 650°-750° C. In this way, microcapsules coated with thoria, ceria, alumina and the like are readily prepared. The additional coating provides increased temperature stability and strength to the microcapsules.

EXAMPLE 5

Microcapsules prepared according to Examples 1, 2 or 3 can be further coated to impart advantageous properties thereto, by covering them with pyrolytic graphite or pyrocarbon in amorphous form (herein collectively termed "pyrocarbon") by heating the microcapsules to a temperature in the range of about 800°-1200° C. in a fluidized bed using a mixture of pyrolyzable hyrocarbon gas such as methane or ethane with a diluent such as argon or nitrogen. A vertical, graphite-walled tube furnace is conveniently employed for the purpose. Low flow rates are required as the capsules are relatively light in weight.

Figure 5:
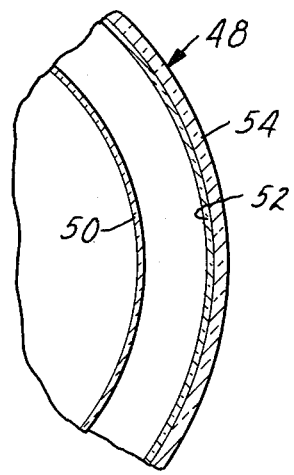

As shown in FIG. 5, a microcapsule 48 having inner and outer spaced walls 50 and 52, respectively, may thus be prepared to have an outer coating pyrocarbon 54, prepared as indicated in Example 3 hereinabove.

In carrying out the coating of the particles, they are placed in the vertical tube furnace above a porous plate through which inlet gas is to be introduced. The reaction zone of the furnace above the particles is then heated to a temperature in the range of about 800°-1200° C. The particles are fluidized, employing a slow stream of argon gas containing 10 percent by volume of methane to bring them into the heated zone of the furnace. The flow of gases is continued until the particles are uniformly coated to the thickness desired. When the particles are coated in the said gas stream, then cooled by removal from the reaction zone, they have a uniform, tough, hard layer of pyrocarbon over their entire surfaces.

EXAMPLE 6

Metallic coatings can be placed upon the microcapsules of Examples 1 to 3 hereinabove, by coating them in a vertical tube furnace in a fluidized bed arrangement, similarly to that described in Example 4 hereof, but employing furnace wall materials which will not react with the metals to be coated upon the surfaces of the microcapsules, at the temperatures employed. Thus, for example, a tungsten tube furnace can be employed in which tungsten hexacarbonyl (W(CO)$_6$), in admixture with dry hydrogen in from 5 to 10 percent concentration, is used as a fluidizing and reactant gas. The microcapsules are placed in the apparatus, upon a porous plate serving to support them until they are fluidized. The furnace is heated to a temperature of about 180°-250° C., whereupon gas flow is initiated. The particles are raised into the reaction zone by the gas pressure, and after a short dwell time of e.g. 10 minutes to one-half hour are found to be coated with a shiny, substantially uniform outer coating of tungsten ranging from 2 to 5 microns in thickness.

Figure 6:
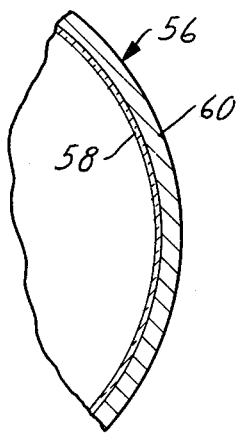

As shown in FIG. 6, a microcapsule 56 thus results having an inner wall 58 coated with an outer layer of tungsten 60. Similar results are obtained when e.g. nickel carbonyl is employed, the temperature being held at from 40°-60° C.

Likewise, metals such as niobium, titanium, platinum and the like can be deposited upon the surfaces of the microcapsules, using the fluidized bed technique, and appropriate metal complexes or volatile metal compounds which decompose at temperatures below the melting point of the ceramic oxide of which the microcapsules are composed, to deposit a layer of the selected metal upon the surfaces of the microcapsules.

Alternatively, metallic coatings can be placed on the microcapsules by plating techniques, which techniques whether electroless or involving electroplating are well known to the art.

It will be apparent that many combinations of coatings and of capsule shell walls, as desired, can be prepared using the procedures described in detail hereinabove.

The multishelled microcapsules produced in accordance with this invention and as particularly shown in the examples can be employed as targets for fusion apparatus. For this purpose they are individually placed in the target location of e.g. a laser beam driven fusion apparatus and subjected to pulsed laser light of high intensity and high energy content. Electron beams are believed to be similarly useful to drive fusion apparatus.

What is claimed is:

1. In an apparatus comprising means for extracting useful energy in a controlled manner from a microcapsule giving off useful energy in a controlled manner when imploded by an energy beam, said microcapsule having a free-flowing, rigid substantially spherical configuration ranging in diameter between 1 and 2,000 micrometers, comprising at least one non-porous inner wall of substantially uniform thickness consisting of homogeneous, non-vitreous, ceramic metal oxide in polycrystalline state having therein a single cavity containing a preselected radioactive composition consisting of the group including deuterium and tritium and mixtures and compounds thereof in gaseous, solid or liquid form, said inner wall being enclosed by at least one concentric outer shell of ceramic oxide, metal or pyrocarbon spaced apart from and surrounding said inner wall, said outer shell being spaced apart from said inner wall by means comprising a skeletal residue structure, wherein said residue structure is formed so as to provide a randomly oriented spacing means having portions thereof in contact with the other surface of said inner wall and the inner surface of said outer shell.

2. A apparatus according to claim 1, wherein said composition comprises a radioactive gas.

3. A apparatus according to claim 1, wherein said composition comprises a radioactive liquid.

4. A apparatus according to claim 1, wherein said composition comprises a radioactive solid material.

5. A apparatus according to claim 1, further comprising a refractory ceramic coating in direct contact with the outer shell.

6. A apparatus according to claim 1, further comprising a metallic coating in direct contact with the outer shell.

7. A apparatus according to claim 6, wherein said metallic coating is formed of tungsten.

8. A apparatus according to claim 1, further comprising a pyrocarbon coating in direct contact with the outer shell.

9. In an apparatus comprising means for extracting useful energy in a controlled manner from a vessel imploded by an energy beam, said vessel giving off useful energy in a controlled manner when imploded by said energy beam, said vessel being capable of storing and transporting prior to use, a preselected composition in gaseous, liquid or solid state, said vessel comprising a free flowing, rigid, substantially spherical microcapsule ranging in diameter between 1 and 2,000 micrometers, comprising at least one non-porous inner wall of substantially uniform thickness consisting of homogeneous, non-vitreous ceramic metal oxide in polycrystalline state having a single cavity containing therewithin a said preselected radioactive composition consisting of the group including deuterium and tritium and mixtures and compounds thereof and being enclosed by at least one concentric outer shell of ceramic oxide, metal or pyrocarbon spaced apart from and surrounding said inner wall, said outer shell being spaced apart from said inner wall by means comprising a skeletal residue structure, wherein said residue structure is formed so as to provide a randomly oriented spacing means having portions thereof in contact with the outer surface of said inner wall and the inner surface of said outer shell.

10. A apparatus according to claim 9, further comprising a refractory ceramic coating in direct contact with the outer shell.

11. A apparatus according to claim 1, wherein the space between the inner wall and outer shell is filled with a gas of predetermined composition.

* * * * *